Patented Apr. 10, 1934

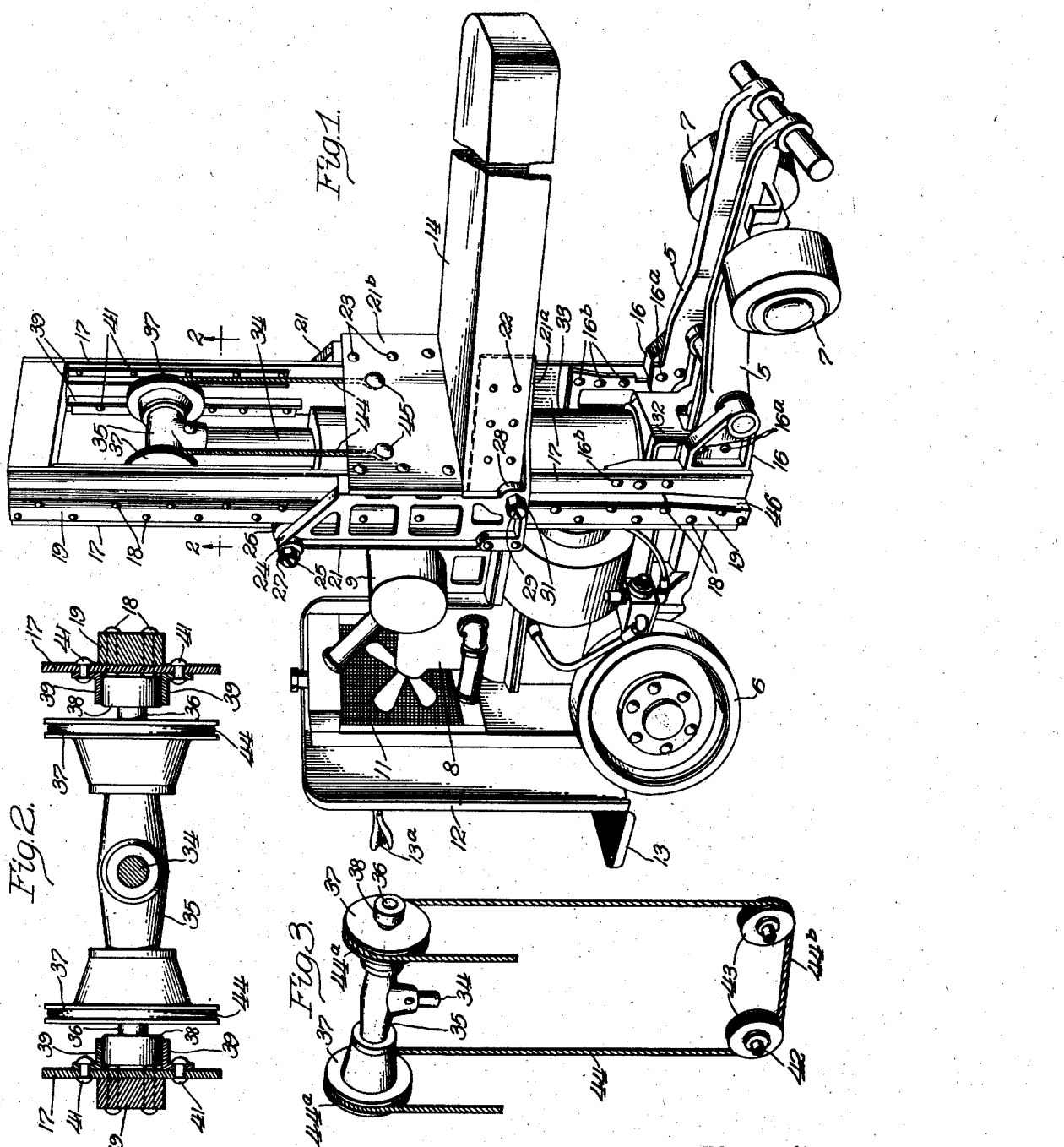

1,954,345

UNITED STATES PATENT OFFICE 1,954,345

INDUSTRIAL TRUCK

Robert J. Burrows, Battle Creek, Mich., assignor to Clark Tructractor Company, Battle Creek, Mich., a corporation of Michigan Application May 2, 1931, Serial No. 534,518

14 Claims. (Cl. 187—9)

The present invention relates to what are commonly known as industrial trucks such as are usually used in and about warehouses, manufacturing-plants, railroad stations, etc., for the transportation of various articles from place to place, and is more particularly concerned with features of construction having to do with trucks of the elevating platform type ordinarily referred to as tiering machines.

My invention has for its principal object to provide improved track means for guiding the elevating frame of the truck in its vertical movements.

Another object of the invention is to provide an improved form of guiding carriage for the elevating platform whereby a cantilever suspension is formed between said platform and said track means.

A further object of the invention is to provide guide means on the inner faces of the vertical standards carrying the track means for guiding the ends of the cross-head on the reciprocating piston rod which operates to raise and lower the elevating platform.

Other objects and advantageous features will appear from the following description of the invention taken in connection with the accompanying drawing, in which Figure 1 is a perspective view of an industrial truck of the tiering machine type having my improvements embodied therein;

Figure 2 is a horizontal cross-sectional view taken on the plane of the line 2—2 of Figure 1 looking up, and showing the cross-head and parts carried thereby in elevation; and Figure 3 is a diagrammatic view illustrating the relation of the operating cable and the sheaves over which it tracks.

In Figure 1 of the drawing I have illustrated in perspective a conventional type of industrial truck equipped with my improvements. The present invention is not concerned with the various details of the truck per se, and hence a brief description of these parts will suffice. Said truck comprises the usual chassis composed of a pair of longitudinally extending side members 5 suitably connected together and braced at spaced points intermediate their length by transversely extending members, as is usual in such constructions. The forward end of the chassis is supported by a pair of front steering wheels 6, one of which is illustrated, while its rear end is supported by a pair of steering wheels 7 interconnected with the front steering wheels.

The truck is propelled by a gasoline engine indicated by the numeral 8, which engine also provides power for raising the elevating platform, as will be hereinafter described. The gasoline tank is indicated by 9, the radiator by 11, and the dash board by 12. The dash board carries at its lower end the usual operator's platform 13. The various controls of the truck are represented by the control lever 13a. It is to be understood, however, that my invention is not limited to use with a truck propelled by a gasoline engine, as it will be readily apparent that it is also applicable for use on trucks of this type operated by means of an electric motor and storage battery.

The reference numeral 14 indicates the horizontally extending vertically movable elevating platform upon which the material to be tiered, transported or otherwise supported is carried. The platform 14 is mounted on the truck for vertical movement by guiding carriages raised and lowered by lifting cables or the like all of which is to be described more in detail later.

Coming now to the improvements with which my present invention is more particularly concerned, a bearing bracket 16 in the form of a suitable casting is secured by means of rivets 16a to the outer side face of each of the members 5 of the chassis about midway of their length, and secured to each of said brackets by means of rivets 16b is a relatively long and narrow vertically extending steel plate 17 to which is secured by means of rivets 18 a solid bar 19 of steel or other material extending the entire length of said plate and positioned intermediate the side margins thereof. The edges of each of the bars 19 form spaced trackways for a guiding carriage comprising two side members in the form of suitable castings 21 each of which is provided with a bracket portion 21a secured to the side walls of the forward end of the lifting platform 14 by means of rivets 22. The carriage castings 21 are rigidly connected together by a relatively wide plate 21b secured to the castings by rivets or bolts 23. The platform 14 to which the brackets 21a are secured also aids in firmly connecting the castings 21 together to move as a unit. The plate 21b also acts as a bumper plate to prevent contact with the upright plates 17 and associated structure. As shown, these castings or members of the carriage extend outside of the bars 19 and beyond the side margins thereof.

Each of said castings is provided at its upper end on one side of the bar 19 with an internally screw-threaded boss 24 in which is threaded a stub axle 25 carrying a roller 26 on its inner end adapted to track along that side of the bar 19.

The outer end of said stub axle extends through said boss and has a lock nut 27 screwed thereon for locking the axle in the boss and holding said roller in proper relation to said bar. A similar internally screw threaded boss 28 is provided in the lower end of each of said castings, on the opposite side of the bar 19, in which is threaded a similar stub axle 29 carrying a similar roller (not shown) on its inner end which is adapted to track along that side of the bar 19. This stub axle 29 is locked in position by a lock nut 31 screwed on the outer end of said axle.

It will thus be seen that the roller 26 at the upepr end of each of the members or castings tracks along one side of the bar 19 while the roller at the lower end of said member tracks along the opposite side of said bar, whereby each of the bars 19 forms a double trackway for its respective member of the carriage. When the platform is loaded the upper rollers of the carriage press against the forward edges of the two bars 19 with a force which is equal to the force with which the lower rollers press against the rear edges of these bars. Since the bars 19 are rigidly secured to the upright plates 17 and are each symmetrical about the transverse plane of their neutral axis a bar which is capable of withstanding the bending stresses imposed thereon by one roller will also be capable of withstanding the bending stresses imposed thereon by the opposite roller without any additional material being added to the bar.

Suitably supported by the members 5 of the chassis midway between the vertically extending plates 17 is a base member 32 in the form of a suitable casting. This base member forms a support for a vertically extending cylinder 33 in which operates a reciprocating plunger provided with a piston rod 34 at its upper end which extends upwardly from the cylinder as shown. Secured to the upper end of the piston rod 34 is a cross-head 35 extending transversely of the truck between the vertical plates 17. Rotatably mounted in said cross-head is a shaft 36 on which are secured to rotate therewith a pair of sheaves 37, one of said sheaves being mounted adjacent each end of the cross-head, as shown in Figure 2. If desired, however, the shaft 36 may be fixed in or to the cross-head and the sheaves journaled on the shaft. Said shaft carries at each outer end a guiding roller 38, (see Figures 2 and 3), which run in track ways formed by laterally spaced vertically extending parallel angle irons 39 secured to the inside faces of the plates 17 by rivets 41, whereby said cross-head and piston rod are properly guided in their vertical movement.

Mounted at laterally spaced points on the side of the base member 32 opposite to that shown in Figure 1 by means of stub axles 42 are a pair of small sheaves 43, the purpose of which will be hereinafter described.

The elevating platform 14 is raised and lowered by the piston rod 34 operating in the cylinder 33 through the instrumentality of a cable 44. This cable is a continuous one, the two ends of which are permanently secured to the back face of the vertical plate 21$^b$ of the elevating platform at the points indicated by 45, as shown in dotted lines in Figure 1. The two upper bights 44$a$ of said cable, as best shown in Figure 3, extend up and over the two sheaves 37 and then downwardly to form a lower bight 44$b$ extending around the two smaller sheaves 43 as also shown in said figure.

When it is desired to raise the elevating platform, oil is pumped into the lower end of the cylinder by means of a suitable oil pump (not shown) operated by power from the engine, and as the oil enters the cylinder the plunger therein is forced upwardly, carrying with it the piston rod 34 carried thereby and the cross-head at the upper end of the piston rod. As the lower bight 44$b$ of the cable is held in position by the lower sheaves 43 during this upward movement of the cross-head, the two sections of the cable between the upper sheaves 37 and the lower sheaves 43 will be lengthened while the two sections of the cable between the upper sheaves and the anchored ends 45 will be shortened, thus raising the elevating platform, as will be readily understood. During this movement of the cross-head the two bights of the cable extending over the upper sheaves 37 will rotate such sheaves and the shaft 36 on which they are mounted in the cross-head 35. With such an arrangement the ratio between the movement of the platform and the movement of the cross-head is two to one.

When it is desired to lower the elevating platform a suitable valve (not shown), that may be operated by the driver from his position on the platform 13, is opened to allow the oil to flow freely from the lower portion of the cylinder to the upper portion thereof, thereby permitting the plunger and piston rod together with the cross-head to move downwardly, and during such downward movement of these parts the movement of the cable is reversed, as will be readily understood. This cylinder and plunger type of raising means is old in the art, and by itself forms no part of my present invention.

The rear side of each of the bars 19,—that side on which the lower roller of the carriage 23 tracks,—is sloped or bevelled adjacent its lower end toward the opposite side, as shown at 46 in Figure 1, and the purpose of this arrangement is so that when the elevating platform is in its lowermost position to receive material from the floor the rear rollers of the vertically movable carriage may take a position slightly forward of their normal position. In this way the platform will rest with its upper surface at a slight angle to the horizontal,—that is to say, the rear end of the platform as viewed in Figure 1 will lie closer to the floor surface than the forward end thereof, which is very advantageous in loading operations, as will be readily appreciated It will be seen from the above description that by means of the single bar 19 secured to each of the plates 17 spaced trackways are provided on opposite sides of said bar, on one of which trackways one of the rollers at one side of the carriage is adapted to track while the other roller on the same side of the carriage is adapted to track on the other trackway formed by said bar, whereby a cantilever suspension is formed for the elevating platform on the platform supporting means.

The terms "front" and "rear" as used above are intended to be only relative terms as the truck may be run in either direction accordingly as controlled by the operator, and either end may be either the front or the rear.

What is claimed is:—

1. In a truck of the class described, the combination with a chassis having side frame members, of a platform supporting frame carried by said chassis, said frame comprising brackets secured at their lower ends to said side frame members, vertically extending plates secured at their lower ends to said brackets, a bar secured to each of said plates between the side margins thereof to form spaced trackways, a platform shiftable vertically along said side frame members and subjecting the latter to eccentric loads, and means connecting the platform with said side frames including vertically spaced members on the platform, the lower member engaging one edge of said bar and the upper member engaging the other edge of the bar, both of said spaced members at each side of the frame being disposed laterally outwardly of but adjacent the side margins of said vertical plates.

2. In a truck of the class described, the combination with a chassis having frame members, of a platform supporting frame comprising plates secured to and extending vertically from said frame members, a bar secured to one side of each of said plates to form spaced trackways and having a width less than the width of the vertical plate to which it is secured, an elevating platform, and a traveling carriage supporting said platform, said carriage including side members each provided with two rollers spaced apart transversely and longitudinally and disposed on opposite sides of the associated bar and adjacent the side of the vertical plate to which the bar is secured, whereby said rollers track on said spaced trackways provided on opposite sides of said bars.

3. In a truck of the class described, the combination with a chassis having side frame members, of a platform supporting frame comprising plates secured to and extending vertically from said side frame members, a bar secured to the outer face of each of said plates to form spaced trackways, and angle iron strips secured to the inner face of each of said plates in parallelism and in spaced relation to form trackways on the inner faces thereof.

4. In a truck of the class described, the combination with a chassis having side frame members, of a platform supporting frame comprising plates secured to and extending vertically from said side frame members, a bar secured to the outer face of each of said plates to form spaced trackways, an elevating platform, a traveling carriage carrying said platform and supporting it by a cantilever suspension formed by means of two longitudinally and transversely spaced rollers at each side thereof adapted to run on said spaced trackways respectively, means including a vertically movable cross-head for moving said carriage vertically, and angle iron strips secured to the inner face of each of said plates in parallelism and in spaced relation to form trackways on the inner faces thereof for guiding the outer ends of said cross-head in its vertical movement.

5. In a truck of the class described, the combination with a chassis having side frame members, of a platform supporting frame comprising plates secured to and extending vertically from said side frame members, a bar secured to the outer face of each of said plates to form spaced trackways, an elevating platform, a traveling carriage carrying said platform and provided with spaced rollers at each side thereof adapted to run on said spaced trackways respectively, means including a vertically movable cross-head extending between said plates for moving said carriage vertically, rollers on the opposite ends of said cross-head, and angle iron strips secured to the inner face of each of said plates in parallelism and in spaced relation to form trackways in which the rollers on said cross-head run.

6. In a truck of the class described, the combination with a chassis having side frame members, of a platform supporting frame comprising plates secured to and extending vertically from each side frame member, a bar secured to each of said plates and having edges adapted to form spaced trackways, an elevating platform, and a traveling carriage supporting said platform, said carriage including side members each provided with two rollers spaced apart transversely and longitudinally, whereby said rollers track on said spaced trackways provided by said bars, the rear edge of each of said bars adjacent the lower end thereof being bevelled toward the opposite edge thereof whereby the rear end portion of said platform will tilt downwardly when in its lowermost position.

7. In a truck of the class described, the combination with a chassis having side frame members, of a platform supporting frame comprising vertically extending plates secured at their lower ends to said side frame members respectively, an elevating platform carried by said chassis and shiftable vertically along said plates, means including a vertically movable cross-head for moving said platform vertically, and means carried by said plates for guiding the outer ends of said cross-head.

8. A truck of the class described comprising a chassis having side frame members, a platform supporting frame comprising plates secured to and extending vertically from said side frame members, guide rails secured to the inner face of each of said plates in parallelism and in spaced relation to form trackways on the inner faces thereof, an elevating platform carried by said chassis and shiftable vertically along said plates, and means for moving said platform vertically including a cross-head having its outer ends movable vertically in and guided by said trackways.

9. A truck of the class described comprising a chassis having side frame members, a platform supporting frame comprising plates secured to and extending vertically from said side frame members and provided with spaced trackways on their outer faces, an elevating platform, a traveling carriage carrying said platform and provided with spaced rollers at each side thereof adapted to run on said spaced trackways, means including a vertically movable cross-head disposed between said plates for moving said carriage vertically, rollers on the opposite ends of said cross-head, and angle iron strips secured to the inner face of each of said plates in parallelism and in spaced relation to form trackways in which the rollers of said cross-head run.

10. A truck of the class described comprising a chassis having side frame members, a platform supporting frame comprising plates secured to and extending vertically from said side frame members and provided with spaced trackways on their outer faces, an elevating platform, a traveling carriage carrying said platform and provided with spaced rollers at each side thereof adapted to run on said spaced trackways respectively, means including a vertically movable cross-head extending between said plates for moving said carriage vertically, and rollers on the opposite ends of said cross-head, the inner face of each of said plates being provided with parallel spaced trackways in which the rollers on said cross-head run.

11. In a truck of the class described, the combination with a chassis having side frame members, of a platform supporting frame comprising plates secured to and extending vertically from each side frame member, an elevating platform movable vertically along said plates, and means on the outer faces of said plates for guiding said platform in its vertical movement and for permitting said platform to tilt when in lowered position.

12. In a truck of the class described, the combination with a chassis having side frame members, of a platform supporting frame comprising plates secured to and extending vertically from each side frame member, an elevating platform movable vertically along said plates, a bar secured to the outer face of each of said plates, and means carried by the platform and engaging opposite edges of each bar for guiding said platform in its vertical movement, at least one edge of each of the bars having a tapered portion providing for tilting the platform when said last named means engages the tapered portion.

13. In a truck of the class described, the combination with a chassis having side frame members, of a platform supporting frame comprising vertically extending plates secured at their lower ends to said side frame members respectively, an elevating platform carried by said chassis and shiftable vertically along said plates, means including a vertically movable cross-head for moving said platform vertically, means carried by said plates for guiding the outer ends of said cross-head, and means for guiding the platform along the plates.

14. A truck of the class described comprising a chassis having side frame members, a platform supporting frame comprising plates secured to and extending vertically from said side frame members, guide rails secured to the inner face of each of said plates in parallelism and in spaced relation to form trackways on the inner faces thereof, an elevating platform carried by said chassis and shiftable vertically along said plates, means for moving said platform vertically including a cross-head having its outer ends movable vertically in and guided by said trackways, and means for guiding the platform along the sides of the plates in parallelism with respect to said guide rails.

ROBERT J. BURROWS.